Aug. 31, 1937.  W. DE LONG ET AL  2,091,501

POWER HACKSAW GRINDING MACHINE

Filed Sept. 24, 1935   5 Sheets-Sheet 1

Inventors
Walter DeLong
Chris C. Andersen
By C.A.Snow&Co.
Attorneys

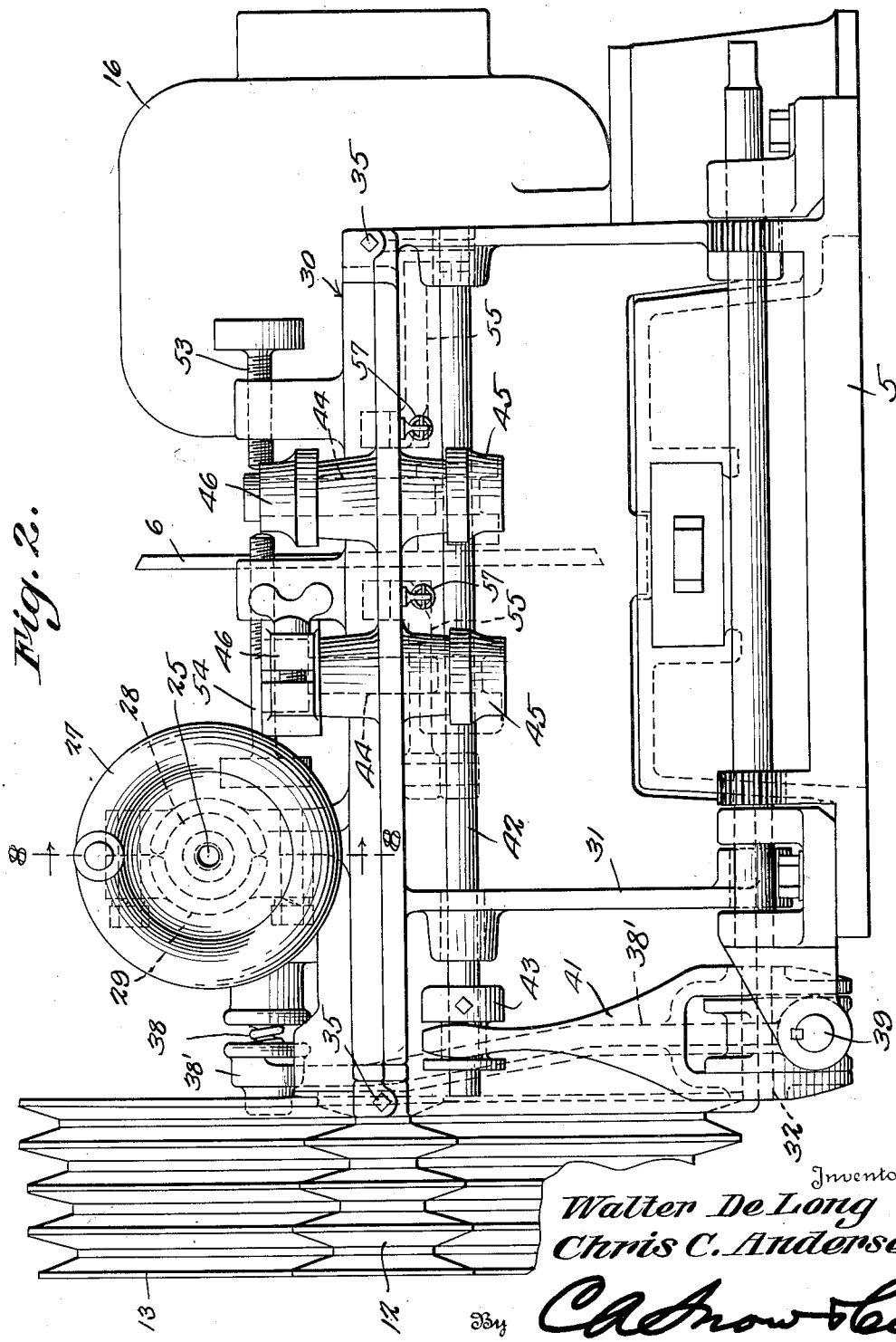

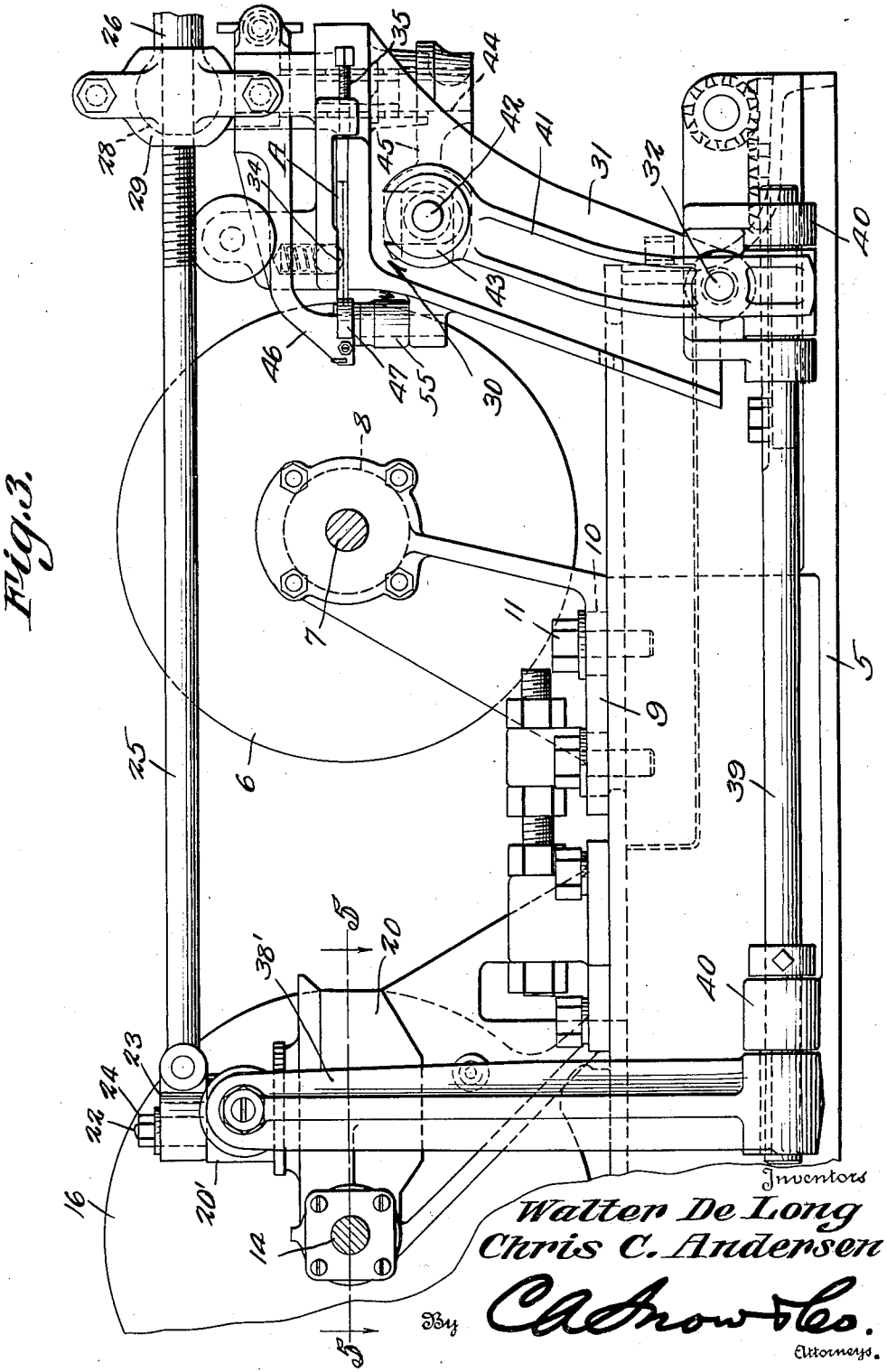

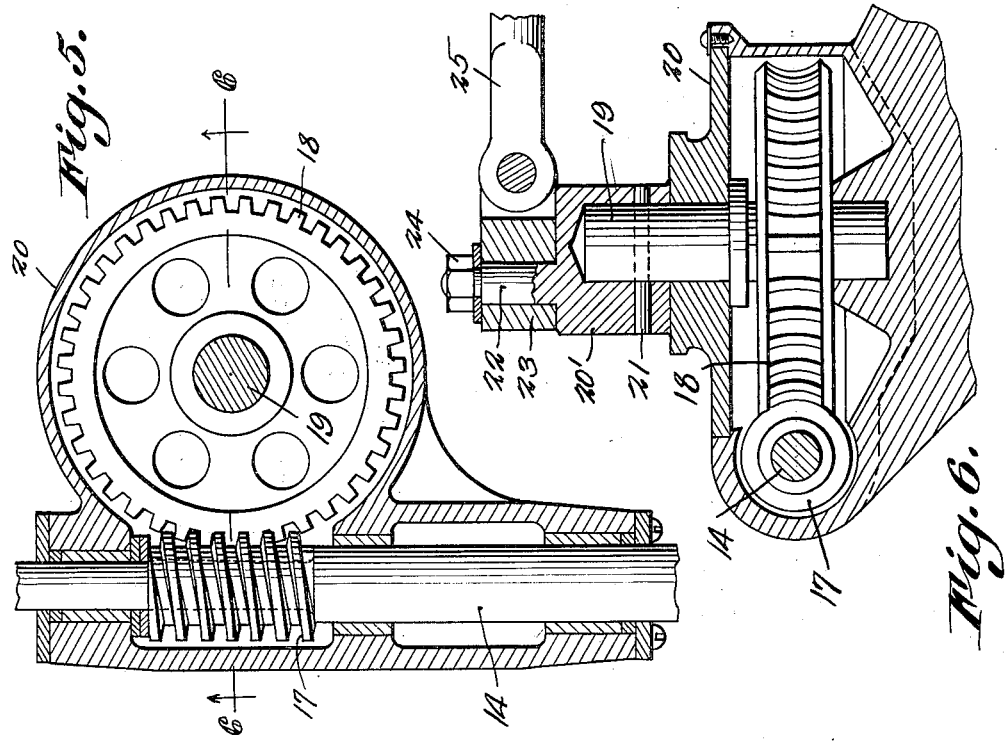

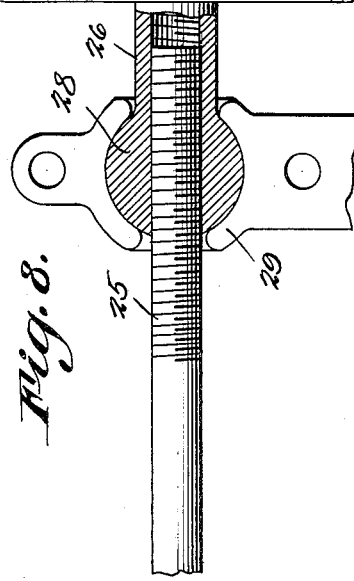
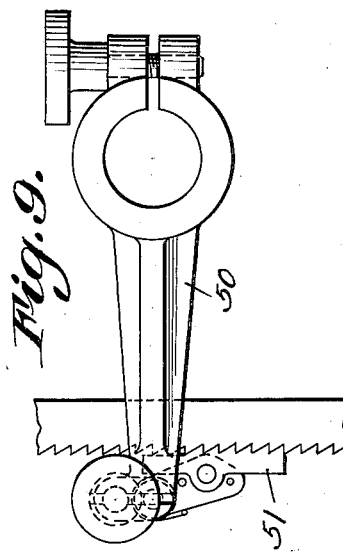
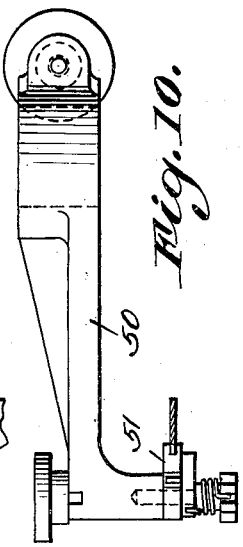
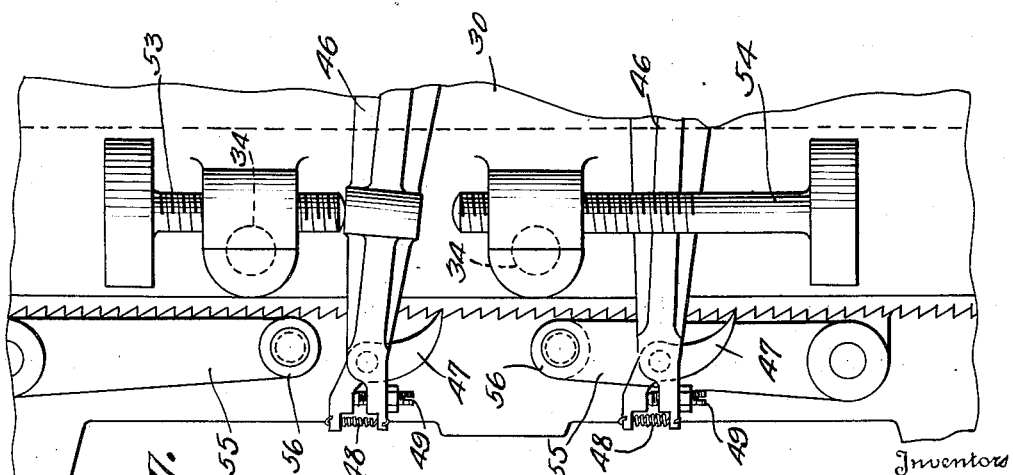

Patented Aug. 31, 1937

2,091,501

UNITED STATES PATENT OFFICE 2,091,501

POWER HACKSAW GRINDING MACHINE

Walter De Long and Chris C. Andersen, Southgate, Calif., assignors to Velvet Power Hacksaw Grinding Machine Co., Southgate, Calif.

Application September 24, 1935, Serial No. 41,947

3 Claims. (Cl. 76—42)

This invention relates to a machine designed for grinding and resharpening power hacksaw blades, the primary object of the invention being to provide a machine of this character which will automatically move the saw to bring the teeth of the saw successively into position to be ground and sharpened. Another object of the invention is to provide means for automatically moving the saw towards and away from the grinding wheel, as the saw blade under operation is being advanced to bring another tooth into a position to be ground.

A further object of the invention is to provide means for adjusting the throw of the machine, to the end that an adjustment may be made adapting the machine for use in grinding saws wherein the teeth are of various sizes.

With the foregoing and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the drawings:

Figure 2 is a front elevational view thereof.

Figure 3 is a side elevational view of the machine.

Figure 4 is a sectional view taken on line 4—4 of Figure 1.

Figure 5 is a sectional view taken on line 5—5 of Figure 3.

Figure 6 is a sectional view taken on line 6—6 of Figure 5.

Figure 7 is a fragmental plan view illustrating the levers for advancing the saw to the grinding wheel.

Figure 8 is a sectional view taken on line 8—8 of Figure 2.

Figure 9 is a view illustrating a modified form of saw advancing lever.

Figure 10 is an end elevational view thereof.

Figure 1:
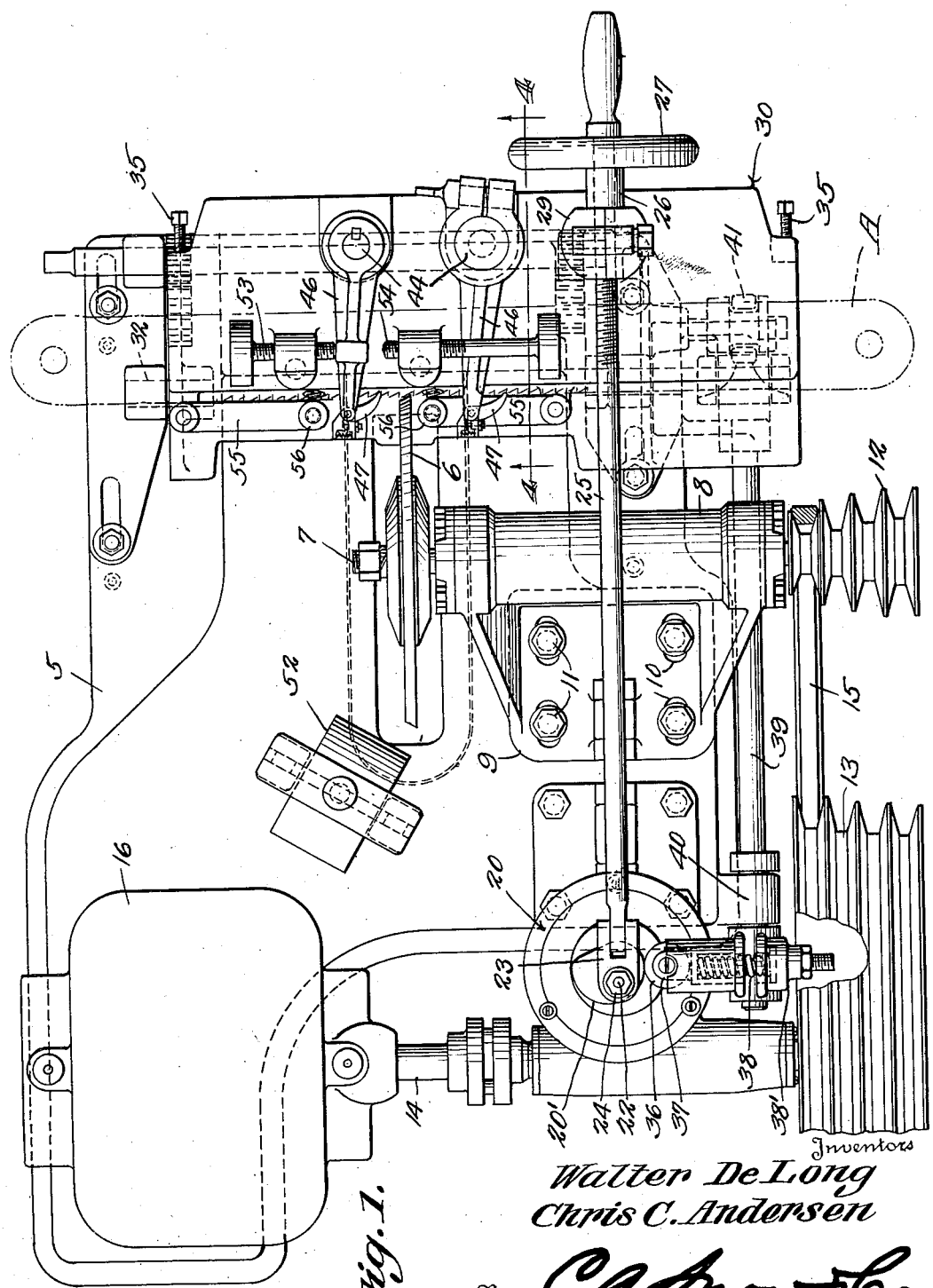
Figure 1 is a plan view of a machine constructed in accordance with the invention.

Referring to the drawings in detail the reference character 5 designates the base of the machine on which the motor grinding wheel and other mechanism of the machine, are supported.

The grinding wheel is indicated by the reference character 6, and is mounted on the shaft 7 that is held in bearings mounted within the tubular support 8. The tubular support 8 embodies a base 9 with elongated openings 10 for the reception of the bolts 11 that secure the base in position on the base 5. Due to the construction of the openings 10, it will be seen that the grinding wheel 6 may be adjusted longitudinally of the base 5, compensating for wear and stretch of the V-belt 15.

A pulley indicated at 12 is mounted on one end of the shaft 7 and receives motion from the pulley 13 mounted on the power shaft 14, through the belt 15. The shaft 14 is rotated by the motor 16, which is of the electric type.

The shaft 14 is formed with a worm 17 that meshes with the gear 18 that in turn is secured to the vertical shaft 19 that extends through the casing 20 in which the gear 18 operates.

Mounted on the upper end of the shaft 19, is a head 20', secured to the shaft by means of the pin 21 that extends through the head and shaft. Rising from the head 20', and disposed eccentrically thereof, is a shaft 22 on which the yoke 23 is mounted, the yoke being secured in position by means of the nut 24.

Pivotally connected with the yoke 23, is a shaft 25 that extends into the sleeve 26, the sleeve and shaft being threaded, so that an adjustment of the shaft may be made. On one end of the sleeve 26 is a hand wheel 27, by means of which the sleeve 26 may be moved with respect to the shaft 25.

On one end of the sleeve 26 is an enlargement 28, the outer surface of which is curved to fit within the socket 29 carried by the chuck support 30, so that pivotal movement of the shaft 25 and sleeve 26 with respect to the chuck, will be permitted. The chuck support includes an arm 31 which is pivotally mounted on the base, at 32. A slot, for the reception of the saw blade to be sharpened, is formed longitudinally of the chuck support, and is of a depth to receive the saw blade in such a way that the teeth of the blade will extend beyond the forward edge of the chuck where they may contact with the grinding wheel 36. Spring pressed balls 34 extend through the chuck and frictionally engage the upper surface of the saw blade under treatment, with the result that the saw may be moved longitudinally of the chuck, in a manner to be hereinafter more fully described, but will be securely held against movement, while the grinding wheel 6 is contacting therewith, during the grinding operation. Adjusting bolts 35 operate through the chuck and engage the rear edge of the saw blade held in the chuck, the saw blade being shown in dotted lines in Figure 1 of the drawings and indicated by the reference letter A. These adjusting screws operate to move the saw blade to its proper position where it may be ground by the wheel 6.

The head 20' is in the form of a cam, as clearly shown by Figure 1 of the drawings and as this head rotates, it engages the wheel 36 carried on the inner end of the shaft 37, there being provided a spring 38 for cushioning the movements of the shaft 37.

This shaft 37 is mounted on the arm 38' that is secured to the shaft 39 mounted in bearings 40 in such a way that the shaft 39 may rotate a predetermined distance. At the opposite end of the shaft 39, is a vertical arm 41 pivotally mounted on the shaft 32, so that the arm 41 may rock with the chuck, when the chuck is moved by the action of the shaft 25. The upper end of the arm 41 is forked and straddles the shaft 42, the connection between the arm 41 and shaft 42 being made through the adjustable nuts 43, which are shown as mounted on the shaft 42. Forming a part of the chuck, are vertical shafts 44 to which the arms 45 are connected, the arms 45 having forked ends that straddle the shaft 42, whereby movement of the shaft 42 will cause the arms 45 to rock.

At the upper ends of the shafts 44, there are arms 46 that are secured to the shafts to swing therewith. These arms 46 extend forwardly to positions adjacent to the teeth of the saw held within the chuck. On the outer ends of the arms 46, are pawls 47 that swing forwardly to engage the teeth of the saw blade, as shown by Figure 7 of the drawings, under the action of the coiled springs 48. Adjusting screws 49 are used in connection with the pawls 47 and provide means for adjusting the pivotal movements of the pawls 47. Thus it will be seen that as the arms swing forwardly, the pawls 47 will engage the teeth of the saw blade, moving the saw blade so that the tooth next to the tooth ground, will be brought into position opposite to the grinding wheel so that when the chuck is moved towards the grinding wheel and to the limit of its forward movement, the tooth will be ground and resharpened.

In order that various sized saw teeth may be sharpened, adjusting screws 53 and 54 are provided near the arms 46, one of the arms 46 operating between the adjacent ends of the screws 53 and 54. By moving these adjusting screws 53 and 54 the stroke of the arm 46 operating therebetween, may be adjusted.

Pivotally supported on the frame of the machine are arms 55 that carry rollers 56 which move over the teeth of the saw under treatment, as the saw is moved through the chuck, advancing the teeth to positions to be ground. These arms and rollers provide stops restricting movement of the saw blade forwardly on the chuck and with respect to the chuck. Coiled springs 57 are connected with the arms 55 and normally urge the arms and rollers supported thereby towards the saw blade. In the form of the invention as shown by Figures 9 and 10 of the drawings, the arms 50 are provided with bars 51 pivotally mounted at the outer ends of the arms 50, the bars 51 having teeth adapted to mesh with the teeth of the saw blade being sharpened. This type of feeding mechanism is used when a saw blade is being sharpened wherein certain of the teeth have been broken out.

From the foregoing it will be seen that due to the construction shown and described, it is only necessary to position the saw blade to be sharpened, and start the motor 16. The saw blade will be automatically moved into engagement with the grinding wheel 6, grinding the teeth and sharpening the saw blade.

Mounted on the base, is a grinding stone 52, which is set at an angle with respect to the grinding wheel 6, so that grinding surface of the grinding wheel may be dressed, when the same becomes rough and irregular.

Having thus described the invention, what is claimed is:

1. A hacksaw blade sharpening machine comprising a base, a grinding wheel on the base, a motor mounted on one end of the base, means for transmitting movement of the motor to the grinding wheel, a power shaft mounted on the base and operated by the motor, a chuck pivotally mounted at the opposite end of the base, means for securing a saw blade to the chuck, a vertical shaft mounted on the base, and operated by the power shaft, a head eccentrically mounted on the vertical shaft providing a cam, a stub shaft rising from the head and mounted eccentrically with respect to the head, a yoke mounted on the stub shaft, a shaft connected to the yoke and reciprocated as the yoke is rotated, the opposite end of the shaft being connected to the chuck, moving the chuck toward and away from the grinding wheel, and means operated by the cam for moving the saw blade transversely of the chuck, advancing the blade whereby the teeth of the blade are successively brought into engagement with the grinding wheel.

2. A hacksaw blade grinding machine comprising a base, a grinding wheel, a motor mounted on the base, means for transmitting movement of the motor to the grinding wheel, a vertical shaft operated by the motor, a head eccentrically mounted on the shaft providing a cam, a stub shaft rising from the head and mounted eccentrically with respect to the head, a saw blade chuck mounted adjacent to the grinding wheel, a yoke mounted for rocking movement on the stub shaft, a shaft connecting the yoke and chuck whereby rotary movement of the stub shaft rocks the chuck, moving the saw blade into and out of contact with the grinding wheel, and means operated by the cam for operating the saw moving the saw transversely of the base.

3. A hacksaw blade sharpening machine comprising a base, a motor mounted on the base, a grinding wheel mounted on the base and operated by the motor, a saw blade chuck pivotally mounted on the base, arms pivotally mounted on the chuck, pawls pivotally mounted on the outer ends of the arms and engaging the teeth of the saw whereby pivotal movement of the arms feeds the saw blade transversely of the chuck, successively advancing the teeth of the saw blade to positions opposite to the grinding wheel, a horizontal shaft on the base, a cam operated by the motor, an arm connected with the shaft, a shaft mounted on the arm, a roller carried at one end of the latter shaft and engaging the cam whereby the latter shaft and horizontal shaft are rocked laterally, means for transmitting movement of the horizontal shaft to the first mentioned arms and saw blade mounted on the chuck, and means for moving the chuck towards and away from the grinding wheel.

WALTER DE LONG.
CHRIS C. ANDERSEN.